United States Patent [19]
Takizawa et al.

[11] Patent Number: 5,789,854
[45] Date of Patent: Aug. 4, 1998

[54] CATHODE RAY TUBE

[75] Inventors: Tomoki Takizawa; Suguru Fujii; Mikako Maeda, all of Nagaokakyo, Japan

[73] Assignee: Mitsubishi Denki Kabushiki Kaisha, Tokyo, Japan

[21] Appl. No.: 554,366

[22] Filed: Nov. 8, 1995

[30] Foreign Application Priority Data

Apr. 21, 1995 [JP] Japan ................... 7-096845

[51] Int. Cl.$^6$ ........................... H01J 29/89
[52] U.S. Cl. ............... 313/478; 313/479; 313/110; 313/112
[58] Field of Search ................... 313/110, 112, 313/478, 479

[56] References Cited

U.S. PATENT DOCUMENTS 5,200,667  4/1993  Iwasaki et al. ............ 313/479
5,291,098  3/1994  Kawamura et al.
5,444,329  8/1995  Matsuda et al. ........... 313/479

FOREIGN PATENT DOCUMENTS

596531  11/1993  European Pat. Off.

*Primary Examiner*—Nimeshkumar Patel

[57] ABSTRACT

A cathode ray tube having a double-layer low-reflective coating layer, or a triple-layer low-reflective coating layer including a high-refractive transparent conductive layer formed on the outer surface of a face plate thereof, and a low-refractive smooth transparent layer formed on the outer surface of the high-refractive transparent conductive layer, or a low-refractive transparent layer having concavities and convexities formed on the low-refractive smooth transparent layer, wherein yellow dye or pigment is added to at least one of said three layers, whereby the reflection spectrum in the visible ray region can be flattened so that a cathode ray tube is obtained in which reflection in the short wavelength region and long wavelength region can be reduced, coloring can be suppressed, and natural external reflected light can be obtained.

18 Claims, 7 Drawing Sheets

Wavelength

Wavelength

CATHODE RAY TUBE

FIELD OF THE INVENTION

This invention relates to a cathode ray tube (hereinafter referred as "CRT") comprising a face plate having, a triple- or double-layer low-reflective coating layer formed on the surface thereof.

DESCRIPTION OF THE RELATED ART

Figure 14:
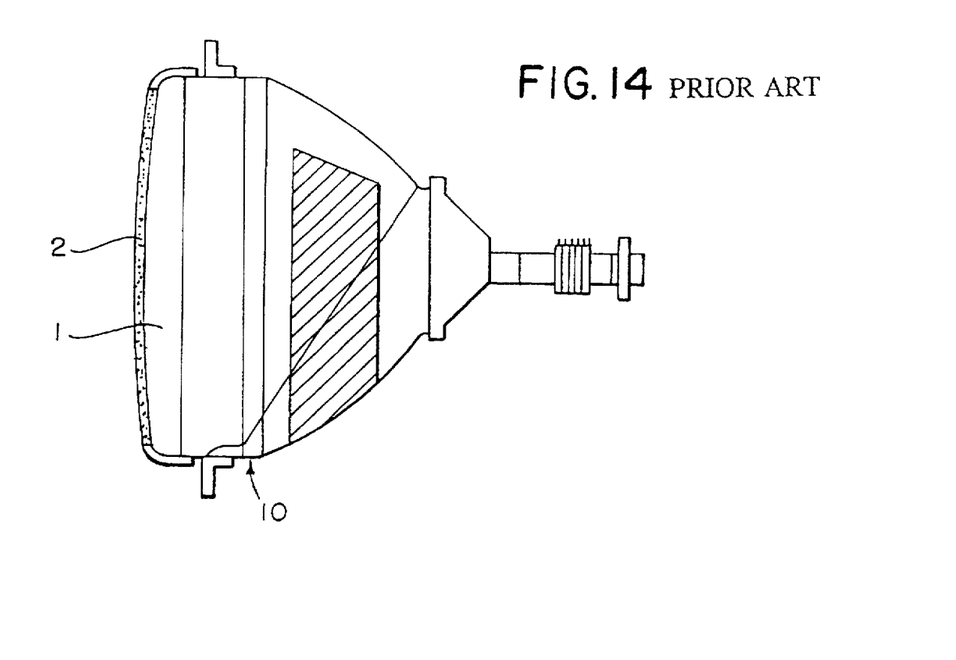
FIG. 14 is a schematic side view showing a conventional cathode ray tube.

Since a conventional CRT reflects external light on the face plate thereof, these CRTs suffer from a problem in that an image displayed thereon cannot be clearly recognized. To overcome this problem, a glare-proofing process has been employed in which a transparent conductive film 2 having concavities and convexities is formed on the surface of the face plate 1 of the CRT 10, illustrated in FIG. 14 so as to irregularly reflect external light incident on the surface of the face plate 1. Since the transparent conductive 2 film having concavities and convexities reflects light emitted by a fluorescent surface of the CRT, as well as external light incident on the surface of the face plate 1, there arises another problem in that the resolution and contrast of the displayed image is deteriorated.

To solve this problem, a low-reflective coating including three or two layers and using the interference effect of light has been put into practical use. The structure of a conventional triple-layer low-reflective coating layer 8 is shown in FIG. 15.

Figure 15:
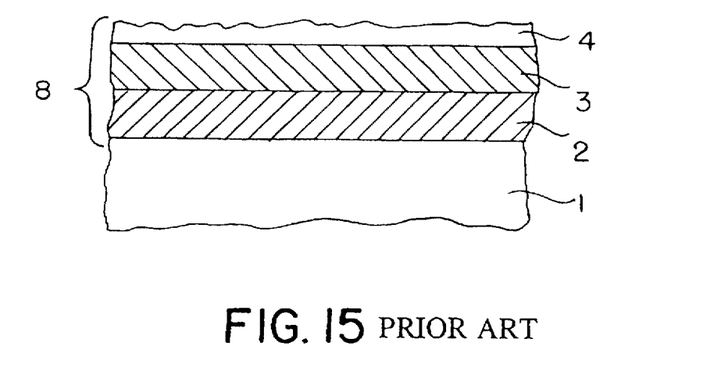
FIG. 15 is a schematic cross sectional view showing a conventional triple-layer low-reflective coating layer.

Referring to FIG. 15, this CRT includes a face plate 1, a high-refractive transparent conductive layer 2, a low-refractive smooth transparent layer 3, and a low-refractive transparent layer 4 having concavities and convexities. The face plate 1 generally has a refractive index $n_0$=1.54 and the high-refractive transparent conductive layer 2 has a refractive index $n_1$, which is greater than the refractive index $n_0$ of the face plate 1. Further, the low-refractive smooth transparent layer 3 and the low-refractive transparent layer 4 having concavities and convexities have refractive indexes $n_2$ and $n_3$, which are lower than the refractive index $n_0$ of the face plate 1 and lower than the refractive index $n_1$ of the high-refractive transparent conductive layer 2. The high-refractive transparent conductive layer 2 may be made of the following high-refractive materials, with their corresponding refractive indices:

$In_2O_3$=2.0
$PbO$=2.6;
$TiO_2$=2.3; and
$SnO_2$=2.0.

The low-refractive smooth transparent layer 3 and the low-refractive transparent layer 4 having concavities and convexities may be made of the following low-refractive materials, with their corresponding refractive indices:

$MgF_2$=1.38; and
$SiO_2$=1.46.

Generally, material are considered low-refractive materials if they have a refractive index of less than about 1.5 and are considered high refractive materials if they have a refractive index greater than about 1.5. However, in principle, the terms "low-refractive" or "high-refractive" is determined in relation to adjoining layers.

From the viewpoint of optical design, when viewed from the interior of the CRT from face plate 1, the first layer is the high-refractive transparent conductive layer 2, the second layer is the low-refractive smooth transparent layer 3, and the third layer is the low-refractive transparent layer 4 having concavities and convexities. The third layer is on the exterior of the CRT 10, closest to a viewer of the CRT.

In addition to the low reflection effect of each layer, a glare-proofing effect of the shape having the concavities and convexities of the low-refractive transparent layer 4 having concavities and convexities, which is the third layer, enables reflection of external light to be reduced considerably without deterioration of the resolution and contrast of an image displayed on the CRT.

Figure 16:
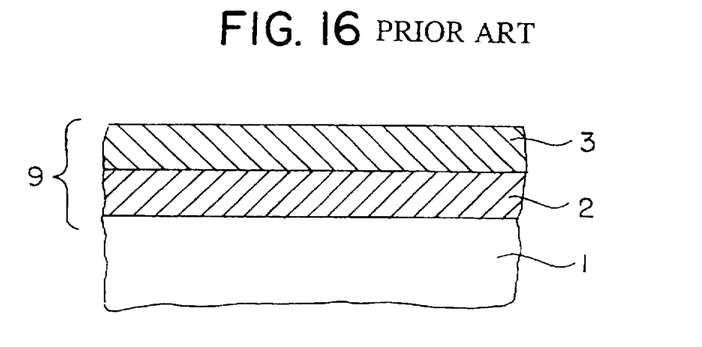
FIG. 16 is a schematic cross sectional view showing a conventional double-layer low-reflective coating layer.

The structure of a conventional double-layer low-reflective coating layer 9 is shown in FIG. 16.

Referring to FIG. 16, essential parts of this CRT include a face plate 1, a high-refractive transparent conductive layer 2, and a low-refractive smooth transparent layer 3. The double-layer low-reflective coating layer 9 is configured such that the high-refractive transparent conductive layer 2 is a first layer when viewed from the face plate 1, and the low-refractive smooth transparent layer 3 is a second layer when viewed from the same.

The double-layer low-reflective coating layer 9 is also able to provide a low reflection effect by preventing reflection of external light due to the interference effect of light without deterioration of the resolution and contrast of an image displayed on the CRT. Although the glare-proofing effect attainable from the concavities and convexities cannot be obtained and therefore the effect is inferior to that of the triple-layer low-reflective coating layer 8, a CRT comprising the double-layer low-reflective coating layer has also been put into practical use.

Figure 17:
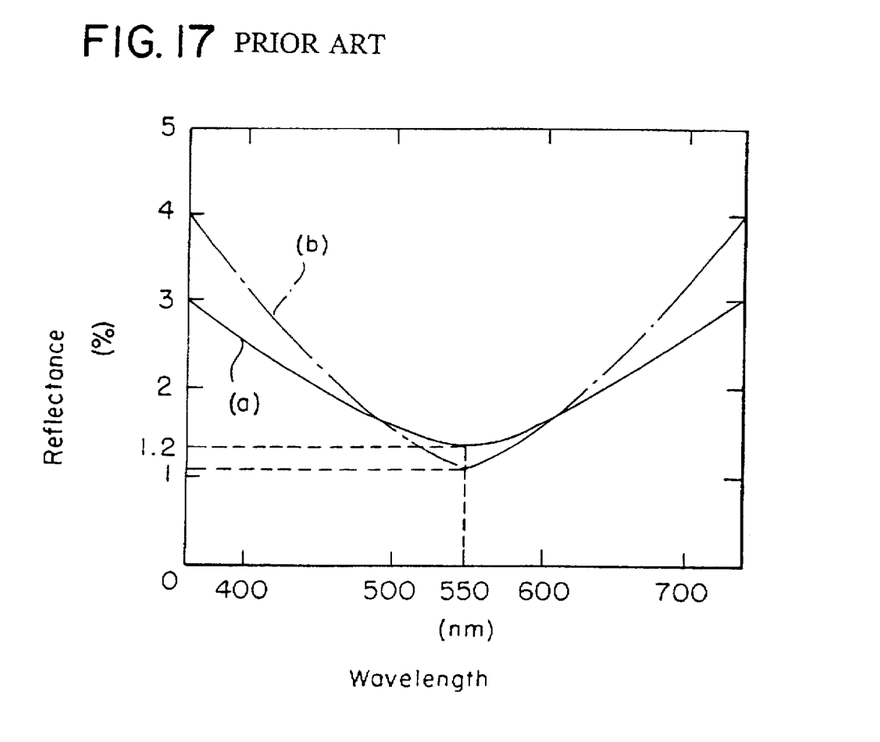
FIG. 17 shows a reflection spectrum of the conventional triple-layer low-reflective coating layer and that of the conventional double-layer low-reflective coating layer.

FIG. 17 shows a reflection spectrum (the reflectance) of the conventional triple-layer low-reflective coating layer 8 and that of the double-layer low-reflective coating layer 9 with respect to wavelengths of light. Curve (a) illustrates the reflection spectrum of the triple-layer low-reflective coating layer 8 and Curve (b) illustrates of the double-layer low-reflective coating layer 9.

As can be understood from FIG. 17, the reflection spectrum is, in either case, a concave spectrum shape having a minimum near 550 nm, in which the reflectance is higher in a wavelength region of 450 nm or shorter and 650 nm or longer.

That is, in the visible ray region, the reflection of green light (492 nm to 577 nm) is prevented, whereas blue light (455 nm to 492 mm) and red light (622 nm to 770 nm) are undesirable reflected, resulting in reflected light being purple in color.

Since the reflection of colored light on the surface of the face plate of the CRT tires the eyes of a person who views the CRT, it is preferable that the color be natural as much as possible.

SUMMARY OF THE INVENTION

This invention solves the above-described problems. It is an object of the invention to obtain a cathode ray tube having a triple- or double-layered low reflective coating layer that is capable of preventing colored light from being reflected by the surface of the face plate thereof.

A cathode ray tube according to the invention includes a triple-layer low-reflective coating layer having a high-refractive transparent conductive layer formed on the outer surface of a face plate thereof, a low-refractive smooth transparent layer formed on the outer surface of the high-refractive transparent conductive layer and a low-refractive transparent layer having concavities and convexities formed on the low-refractive smooth transparent layer, wherein a yellow dye or pigment is added to at least one of the three layers.

A cathode ray tube according to the invention includes a double-layer low-reflective coating layer having a high-refractive transparent conductive layer, which is a first layer formed on the outer surface of a face plate thereof, and a low-refractive smooth transparent layer, which is a second layer formed on the outer surface of the high-refractive transparent conductive layer, which is the first layer, wherein a yellow dye or pigment is added to at least one of the two layers.

Accordingly, with a cathode ray tube of the invention, since the yellow dye or pigment is added to at least one of the layers of the triple-layer low-reflective coating layer, the reflection spectrum of reflected light from the face plate can be reduced, and the reflection of colored light at the outer surface of the face plate can be suppressed.

Other objects and advantages of this invention will become apparent from the detailed description given hereinafter. It should be understood, however, that the detailed description and specific embodiment are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

The various embodiments of the present invention will now be described with reference to the drawings.

Referring to the drawings, the same reference numerals represent the same or corresponding elements as those of the conventional example.

Embodiment 1

Figure 1:
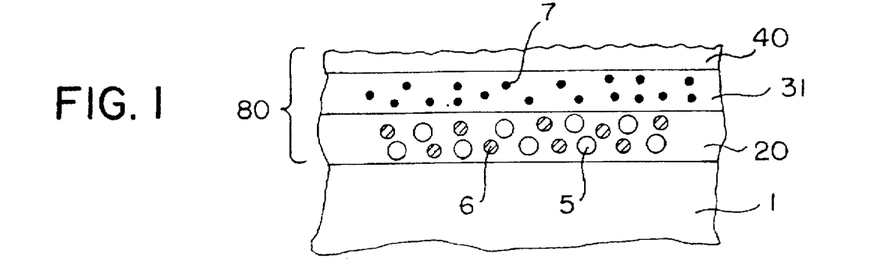
FIG. 1 is a schematic cross sectional view present showing a triple-layer low-reflective coating layer according to embodiment 1 of the present invention.

FIG. 1 is a schematic cross sectional view showing the structure of a triple-layer low-reflective coating layer for use in a cathode ray tube (CRT) according to the present invention.

Referring to FIG. 1, this CRT comprises a face plate 1; a high-refractive transparent conductive layer 20, which is a first layer when viewed from the outer surface of the face plate 1, and which includes $SnO_2$ particles 5 and carbon black 6 such as a black-colored conductive particles; a low-refractive smooth transparent layer 31 which is a second layer, and a low-refractive transparent layer 40 having concavities and convexities which is a third layer. In the present invention, the high-refractive transparent conductive layer 20 has a refractive index which is higher than a refractive index of the face plate 1 and the low-refractive smooth transparent layer 31 and the low-refractive transparent layer having concavities and convexities both have refractive indices which are lower than that of the high-refractive transparent conductive layer 20.

A triple-layer low-reflective coating layer 80 is configured with the high-refractive transparent conductive layer 20 which is the first layer, the low-refractive smooth transparent layer 31 which is the second layer, and the low-refractive transparent layer 40 having concavities and convexities which is the third layer.

The high-refractive transparent conductive layer 20, which is the first layer, is formed using liquid such as SUMICE FINE ARS-M-3 manufactured by Sumitomo Osaka Cement; the low-refractive smooth transparent layer 31 is formed using liquid which is SUMICE FINE ARG-M-1 manufactured by Sumitomo Osaka Cement; and the low-refractive transparent layer 40 having concavities and convexities is formed using liquid which is Colcoat R manufactured by Colcoat Co., Ltd.

Yellow dye 7 is added to SUMICE FINE ARG-M-1, which is the liquid for forming the low-refractive smooth transparent layer 31, which is the second layer, and is Astrazon Yellow 7GLL (C.I. Basic Yellow 21).

In a preferred embodiment of the present invention, the high-refractive transparent conductive layer 20 is made of $SnO_2$ or $In_2O_3$ and both the low-refractive smooth transparent layer 31 and the low-refractive transparent layer 40 having concavities and convexities are both made of $SiO_2$ and therefore have substantially the same refractive index, so as to be optically configured as a single low-refractive layer.

A method of forming the triple-layer low-reflective coating layer 80 will now be described.

Initially, the temperature of the face plate 1 of the completed CRT is raised to 40° C. to 50° C. in a preheating furnace. To form the first layer, SUMICE FINE ARS-M-3 is spin-coated, followed by being dried so that the high-refractive transparent conductive layer 20 is formed. To form the second layer, SUMICE FINE ARG-M-1, to which the yellow dye 7 is added, is spin-coated, followed by being dried so that the low-refractive smooth transparent layer 31 is formed.

Spin-coating is a well-known technique known in this art for forming a layer of desired thickness, if that thickness has been specified. In the spin-coating technique, the coating environment, such as the temperature and humidity and the temperature of the coating face; the number of rotations or spins during the coating process; and the liquidity (including the solidity and viscosity) of the material to be spin-coated are controlled so as to obtain a desired film thickness. The coating environment is strongly related to the liquid evaporating speed of the material to be spin-coated, the number of rotations or spins during the coating process controls the film thickness by centrifugal force, and the liquidity of the liquid is strongly related to the liquid spreading characteristics of the liquid to be spin-coated.

The film thickness d of the layer to be spin-coated is related to the wavelength $\lambda$ for obtaining minimum reflectance and is determined by the equation below:

$$\text{Optical film thickness } nd = \lambda/4$$

where n=refractive index of the material.

Figure 3:
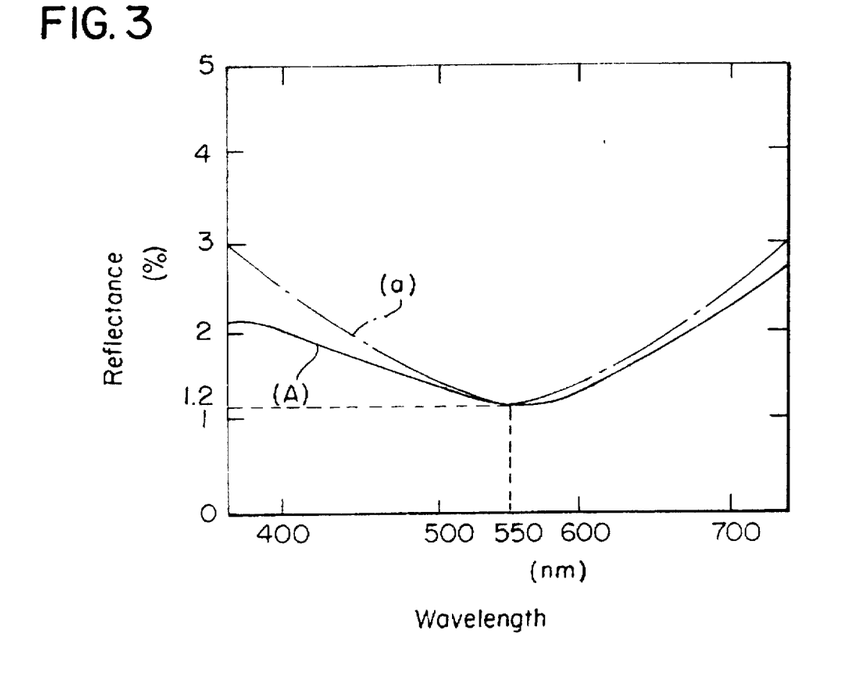
FIG. 3 shows a reflection spectrum of the triple-layer low-reflective coating layer according to embodiment 1.

According to this equation, the film thickness d is determined by the desired wavelength and controlled by the coating environment, the number of rotations or spins during the coating process, and the liquidity of the material being spin-coated. Further, the film thickness can be calculated by the above equation if the wavelength for obtaining minimum reflectance is determined by a reflectance spectrum, as illustrated in FIG. 3, for example.

Then, the temperature of the face plate 1 is raised to 70° C. to 80° C. in the preheating furnace, and Colcoat R is spray-coated to form the third layer so that the low-refractive transparent layer 40 having concavities and convexities is formed, followed by baking and hardening at 150° C. to 200° C. in the furnace so that the CRT having the triple-layer low-reflective coating layer 80 is formed.

Figure 2A:
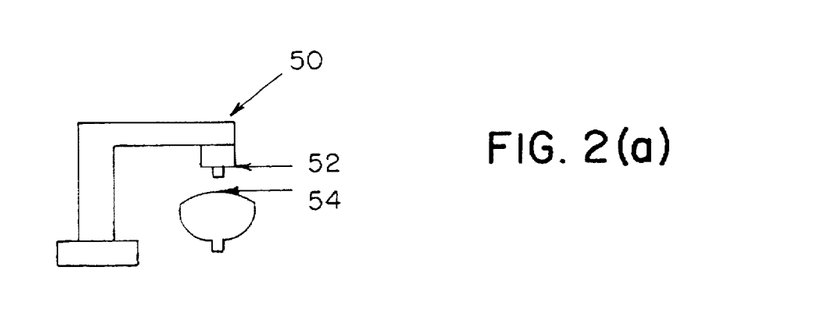
FIG. 2(a)–2(c) illustrates a spray robot utilized for spray-coating.
Figure 2B:
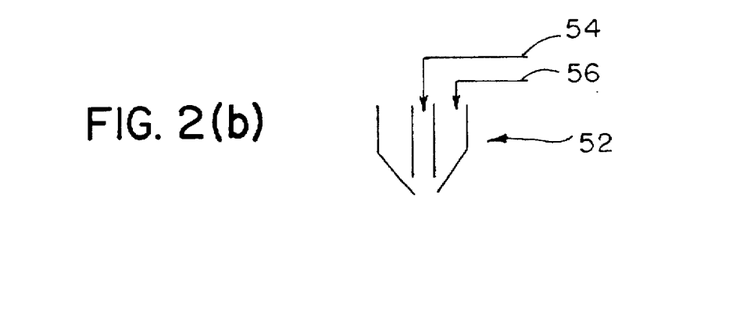
Figure 2C:
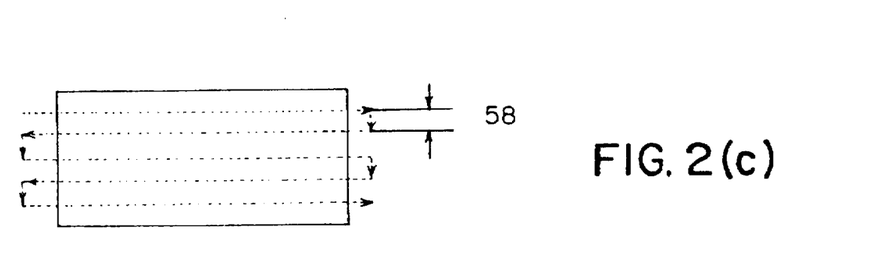

The thickness of the low-refractive transparent layer 40 having cavities and convexities is accurately controlled, in order to ensure that the concavities and convexities have uniform shape, density, and thickness. Spray-coating is one technique to achieve the proper uniformity. A spray robot 50, illustrated in FIG. 2(a), includes a nozzle 52 aimed at a CRT surface 54. The nozzle 52, illustrated in more detail in FIG. 2(b), includes a passage 54 for the coating liquid (Colcoat R) and a passage 56 for atomized air. The nozzle 52 scanning and scanning pitch 58 are illustrated in FIG. 2(c). In order to ensure uniformity of the concavities and convexities, the following characteristic must be accurately controlled during the spray-coating process:

1) the CRT surface temperature just before spray-coating takes place should be between 70° and 80° C.;
2) the liquid material characteristic (in particular its velocity must be closely controlled)—this is achieved by utilizing Colcoat R, manufactured by Colcoat Co. Ltd.);
3) the nozzle diameter should be between 0.3 and 0.5 mm;
4) the atomized air pressure should be between 2 and 4 kg/cm$^2$;
5) the nozzle scanning pitch should be between 10 and 20 mm;
6) the nozzle scanning speed should be between 800 and 1000 mm/sec;
7) the distance between the nozzle and the CRT surface should be between 20 and 50 mm;
8) the temperature in the spray booth should be between 25° and 30° C.;
9) and the humidity in the spray booth should be between 50 and 80% RH.

FIG. 3 is a graph showing a of comparison between the reflection spectrum of the triple-layer low-reflective coating layer 80 according to the first embodiment of the present invention and that of a triple-layer low-reflective coating layer having a conventional structure to which the yellow dye 7 has not added to the second layer but the residual conditions are the same as those according to the first embodiment. Referring to FIG. 3, curve (A) indicates the reflection spectrum according to the first embodiment, while curve (a) indicates the reflection spectrum of the conventional structure having no yellow dye added thereto.

As shown in FIG. 3, addition of the yellow dye 7 to the low-refractive smooth transparent layer 30, which is the second layer, causes the reflection spectrum in the visible ray region to be flattened as shown in curve (A) as compared with curve (a) in which no yellow dye is added.

That is, the addition of the yellow dye results in suppression of reflected light in the wavelength range of 450 nm or shorter and in the wavelength range of 650 nm or longer, whereby a sharp purple color attained from reflected light is moderated considerably and the color of reflected light is made to be more natural.

In this embodiment the yellow dye 7 is added to the low-refractive smooth transparent layer 31, which is the second layer when viewed from the face plate, so that the low-refractive transparent layer 40 having concavities and convexities, which is the third layer, serves as an overcoat. Thus, the scratch resistance per article 8.4, JIS K 5400 (General Experiment for coating specified in the Japan Industrial Standard) resulted in a pencil hardness of 9H and no scar was observed in 50 or more wear resistance tests using a plastic rubber eraser (commodity No: LION 50-30) without decolorization of the yellow dye.

Embodiment 2

Figure 4:
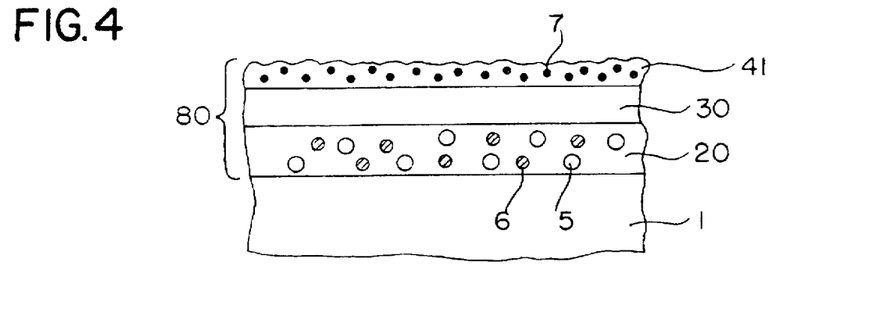
FIG. 4 shows a schematic cross sectional view showing a triple-layer low-reflective coating layer according to embodiment 2.

FIG. 4 is a schematic cross sectional view showing the structure of a triple-layer low-reflective coating layer 80 according to embodiment 2 of the present invention.

In this embodiment, the structure of the triple-layer low-reflective coating layer 80, the material of the liquid and the yellow dye 7 are basically the same as those of embodiment 1. However, as shown in FIG. 3, the yellow dye 7 is not added to a low-refractive smooth transparent layer 30 which is the second layer, but the yellow dye 7 is added to the foregoing Colcoat R by 0.04 wt % so that a low-refractive transparent layer 41 having concavities and convexities, which is the third layer when viewed from the face plate, is formed.

The reflection spectrum in the visible ray region in embodiment 2 is the same as that attained from embodiment 1 shown in FIG. 3 such that coloring of reflected light was considerably suppressed as compared with the case where no yellow dye was added and natural reflected light of external light was obtained.

The scratch resistance per article 8.4, JIS K 5400 (General Experiment for coating specified in the Japan Industrial Standard) resulted in a pencil hardness of 9H and no scar was observed in 50 or more wear resistance tests using a plastic rubber eraser (commodity No: LION 50-30). However, the dye on the outer surface of the low-refractive transparent layer 40 having concavities and convexities was directly worn and thus the yellow dye was decolored to a degree at which the quality as the product was maintained.

Embodiment 3

Figure 5:
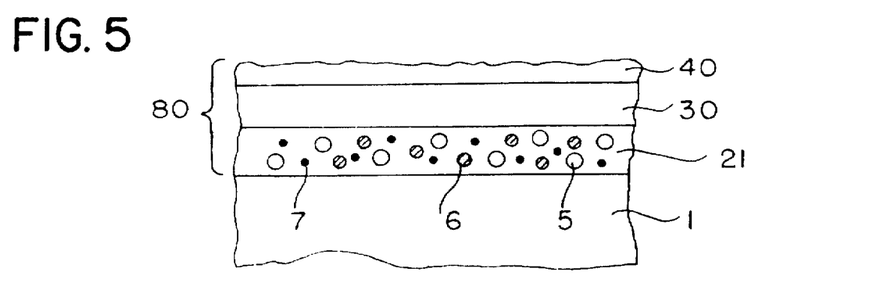
FIG. 5 is a schematic cross sectional view showing a triple-layer low-reflective coating layer according to embodiment 3.

FIG. 5 is a schematic cross sectional view showing the structure of a triple-layer low-reflective coating layer 80 according to embodiment 3 of the present invention.

In this embodiment, the structure of the triple-layer low-reflective coating layer 80, the material of the liquid and the yellow dye 7 are basically the same as those of embodiment 1. However, the yellow dye 7 is, as shown in FIG. 5, added to the foregoing SUMICE FINE ARS-M-3 by 0.04 wt % so as to be spin-coated so that a high-refractive transparent conductive layer 21, which is the first layer, is formed.

The reflection spectrum in the visible ray region in the foregoing case was the same as that attained from embodiment 1 shown in FIG. 1 such that coloring of reflected light is considerably suppressed as compared with the case where no yellow dye was added and natural reflected light of external light was obtained.

Since the yellow dye is added to the first layer when viewed from the face plate, the low-refractive smooth transparent layer 30, which is the second layer, and the low-refractive transparent layer 40 having concavities and convexities, which is the third layer, serve as an overcoat. Thus, the scratch resistance per article 8.4, JIS K 5400 (General Experiment for coating specified in the Japan Industrial Standard) resulted in a pencil hardness of 9H and no scar was observed in 50 ore more wear resistance tests using a plastic rubber eraser (commodity No: LION 50-30) without decolorization of the yellow dye.

Note that the yellow dye or the pigment to be added may be of a type that can be dissolved or dispersed in the liquids for forming the first, second and the third layers. The use of other dyes, such as Tetrazine (C.I. Yellow 23) or inorganic pigment, such as chrome yellow (C.I. Pig. Yellow 34) or nickel titanium yellow (C.I. Pig. Yellow 53) or an organic pigment, such as Hansa Yellow G (C.I. Pig. Yellow 1) resulted in a similar effect being attained.

Furthermore, the use of $In_2O_3$ as the high-refractive conductive material for forming the first layer in place of the $SnO_2$ particles, resulted in the same effect.

Embodiment 4

Figure 6:
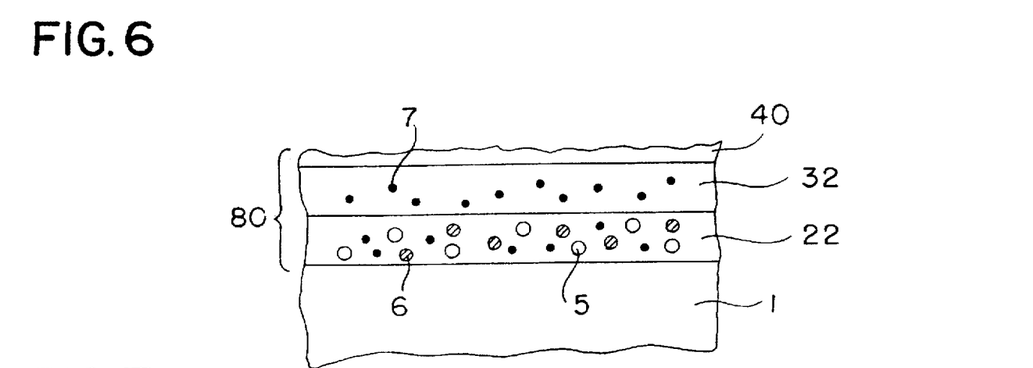
FIG. 6 is a schematic cross sectional view showing a triple-layer low-reflective coating layer according to embodiment 4.

FIG. 6 is a schematic cross sectional view showing the structure of a triple-layer low-reflective coating layer 80 according to embodiment 4 of the present invention.

In this embodiment, the structure of the triple-layer low-reflective coating layer 80, the material of the liquid and the yellow dye 7 are basically the same as those of the embodiment 1. However, the yellow dye 7 is, as shown in FIG. 6, added to the foregoing SUMICE FINE ARS-M-3 by 0.02 wt % so as to be spin-coated so that a high-refractive transparent conductive layer 22, which is the first layer when viewed from the face plate, is formed. Then, the yellow dye 7 is added to the foregoing SUMICE FINE ARG-M-1 by 0.02 wt % so as to be spin-coated so that a low-refractive smooth transparent layer 32, which is the second layer when viewed from the face plate, is also formed.

The reflection spectrum and the strength of the formed film were substantially the same as those attained from embodiment 1, whereby a triple-layer low-reflective coating layer was obtained which did not encounter decolorization of the dye, which exhibited excellent film strength and from which natural reflected light of external light was obtained.

Embodiment 5

Figure 7:
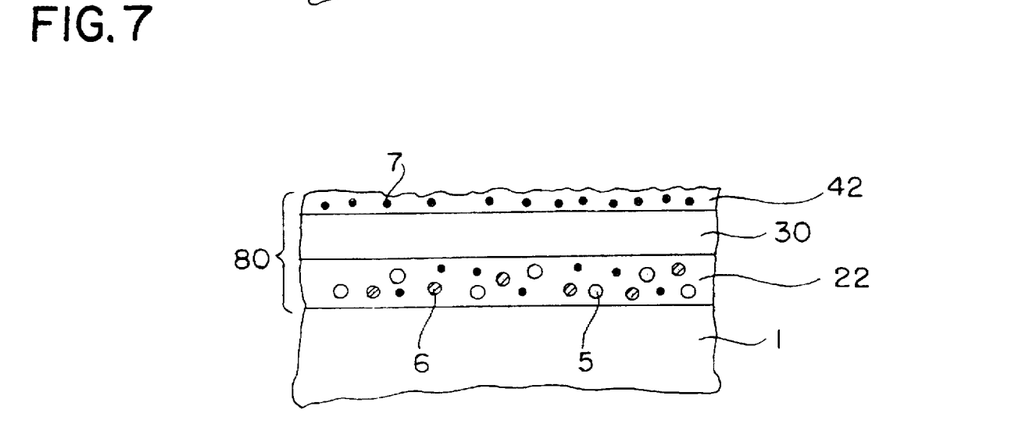
FIG. 7 is a schematic cross sectional view showing a triple-layer low-reflective coating layer according to embodiment 5.

FIG. 7 is a schematic cross sectional view showing the structure of a triple-layer low-reflective coating layer 80 according to embodiment 5 of the present invention.

In this embodiment, the structure of the triple-layer low-reflective coating layer 80, the material of the liquid and the yellow dye 7 are basically the same as those of the embodiment 1. However, the yellow dye 7 is, as shown in FIG. 7, added to the foregoing SUMICE FINE ARS-M-3 by 0.02 wt % so as to be spin-coated so that a high-refractive transparent conductive layer 22, which is the first layer when viewed from the face plate, is formed. Then, the yellow dye 7 is added to the foregoing Colcoat R by 0.02 wt % so as to be spray-coated so that a low-refractive transparent layer 42 having concavities and convexities, which is the third layer when viewed from the face plate, is formed.

Also the reflection spectrum and the strength of the formed film were substantially the same as those attained from embodiment 1, whereby a triple-layer low-reflective coating layer was obtained which exhibited excellent film strength and from which natural reflected light of external light was obtained.

Wear resistance tests performed 50 or more by using a plastic rubber eraser (commodity No: LION 50-30) resulted in the dye caused on the outer surface of the low-refractive transparent layer 42 having concavities and convexities being directly worn. As a result, the yellow dye was decolored to a degree at which the quality as the product was maintained.

Embodiment 6

Figure 8:
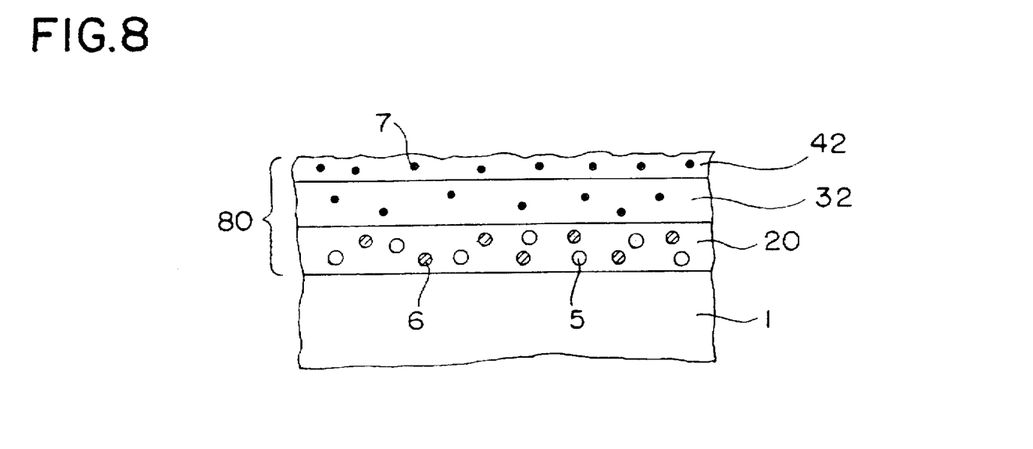
FIG. 8 is a schematic cross sectional view showing a triple-layer low-reflective coating layer according to embodiment 6.

FIG. 8 is a schematic cross sectional view showing the structure of a triple-layer low-reflective coating layer 80 according to embodiment 6 of the present invention.

In this embodiment, the structure of the triple-layer low-reflective coating layer 80, the material of the liquid and the yellow dye 7 are basically the same as those of the embodiment 1. However, the yellow dye 7 is, as shown in FIG. 8, added to the foregoing SUMICE FINE ARS-M-1 by 0.02 wt % so as to be spin-coated so that a high-refractive transparent conductive layer 32, which is the first layer when viewed from the face plate, is formed. Then, the yellow dye 7 is added to the foregoing Colcoat R by 0.02 wt % so as to be spray-coated so that a low-refractive transparent layer 42 having concavities and convexities, which is the third layer when viewed from the face plate, is formed.

The characteristics, such as the reflection spectrum and the strength of the formed film, were substantially the same as those obtained from embodiment 5.

Embodiment 7

Figure 9:
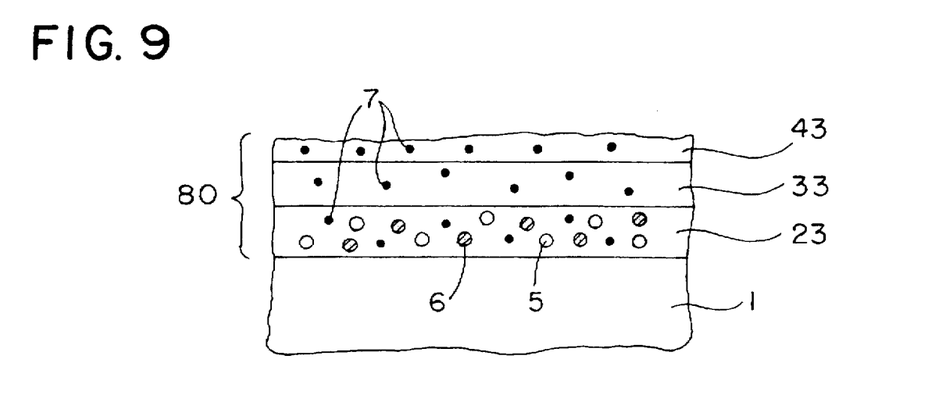
FIG. 9 is a schematic cross sectional view showing a triple-layer low-reflective coating layer according to embodiment 7.

FIG. 9 is a schematic cross sectional view showing the structure of a triple-layer low-reflective coating layer 80 according to embodiment 7 of the present invention.

In this embodiment, the structure of the triple-layer low-reflective coating layer 80, the material of the liquid and the yellow dye 7 are basically the same as those of the embodiment 1. However, the yellow dye 7 is, as shown in FIG. 9.

added to the foregoing SUMICE FINE ARS-M-3 by 0.013 wt % so as to be spin-coated so that a high-refractive transparent conductive layer 23, which is the first layer when viewed from the face plate, is formed. Then, the yellow dye 7 is added to the foregoing SUMICE FINE ARS-M-1 by 0.014 wt % so as to be spin-coated so that a low-refractive smooth transparent layer 33, which is the second layer when viewed from the face plate, is formed, and the yellow dye 7 is added to the foregoing colcoat R by 0.013 wt % so as to be spray-coated so that a low-refractive transparent layer 43 having concavities and convexities, which is the third layer when viewed from the face plate, is formed.

The characteristics, such as the reflection spectrum and the strength of the formed film of the triple-layer low-reflective coating layer 80, were substantially the same as those obtained from embodiment 5.

Embodiment 8

Figure 10:
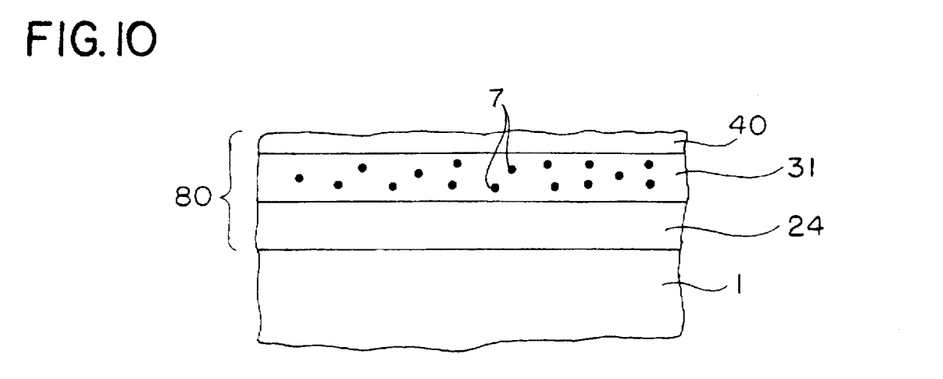
FIG. 10 is a schematic cross sectional view showing a double-layer low-reflective coating layer according to embodiment 8.

FIG. 10 is a schematic cross sectional view showing the structure of a triple-layer low-reflective coating layer 80 according to embodiment 8 of the present invention.

Although the high-refractive transparent conductive layers 20, 21, 22 and 23 were formed by the spin coating method in embodiments 1 to 7, this embodiment was performed such that a high-refractive transparent conductive layer 24, which is the first layer, is formed by a chemical vapor deposition (CVD) method, the yellow dye 7 is added to the foregoing SUMICE FINE ARS-M-1 by 0.04 wt % so as to be spin-coated so that a low-refractive smooth transparent layer 31, which is the second layer when viewed from the face plate, is formed, and then a low-refractive transparent layer 40 having concavities and convexities, which is the third layer when viewed from the face plate, is formed by spray coating so that the triple-layer low-reflective coating layer 80 is obtained.

The characteristics, such as the reflection spectrum and the strength of the formed film of the triple-layer low-reflective coating layer 80, were substantially the same as those obtained from embodiment 1.

The CVD method is a method in which a mixed gas composed of reactive molecules and a carrier, which is inactive with respect to the foregoing gas, is allowed to flow on the surface of a heated substrate and products of hydrolysis and oxidation-reduction are evaporated on the substrate.

Since a high-refractive transparent conductive layer formed by the CVD method encounters a principle difficulty in performing coloring while maintaining a refraction required to attain a low reflective effect, the dye or pigment, that can be dissolved or dispersed in the liquids for forming the second and third layers when viewed from the face plate, is added to the second and third layers.

In a case where the yellow dye 7 is added to the foregoing Colcoat R by 0.04 wt % and, thus the low-refractive transparent layer 41 having concavities and convexities, which is the third layer, is formed and in a case where the yellow dye 7 is added to the foregoing SUMICE FINE ARG-M-1 by 0.02 wt % so as to be spin-coated so that the low-refractive smooth transparent layer 32, which is the second layer when viewed from the face plate, is formed, and the yellow dye 7 is added to the Colcoat R by 0.02 wt % so that the low-refractive transparent layer 42 having concavities and convexities, which is the third layer, is formed, a similar effect to that attainable from embodiment 1 is obtained.

Embodiment 9

Although the embodiments 1 to 8 relate to the triple-layer coating layer, this embodiment relates to a double-layer coating layer.

Figure 11:
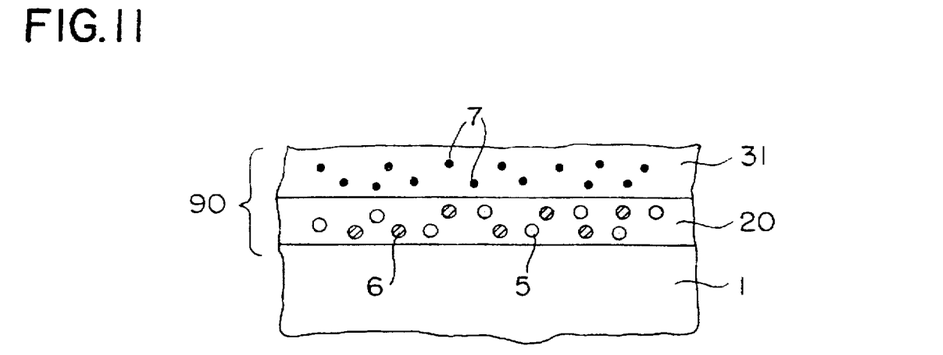
FIG. 11 is a schematic cross sectional view showing a double-layer low-reflective coating layer according to embodiment 9.

FIG. 11 is a schematic cross sectional view showing the structure of a double-layer low reflective coating layer 90.

Referring to FIG. 11, essential parts of this CRT includes a face plate 1, and a high-refractive transparent conductive layer 20, which is a first layer when viewed from the outer surface of the face plate 1, and which is composed of particles 5 of $SnO_2$ and carbon black 6 which are black-colored conductive particles.

By spin-coating the foregoing SUMICE FINE ARS-M-3, the high-refractive transparent conductive layer 20, which is the first layer when viewed from the face plate, is formed. Then, the yellow dye is added to the foregoing SUMICE FINE ARG-M-1 by 0.04 wt % so as to be spin-coated so that the low-refractive smooth transparent layer 31, which is the second layer when viewed from the face plate, is formed. Thus, the double-layer low reflective coating layer 90 is obtained.

Figure 12:
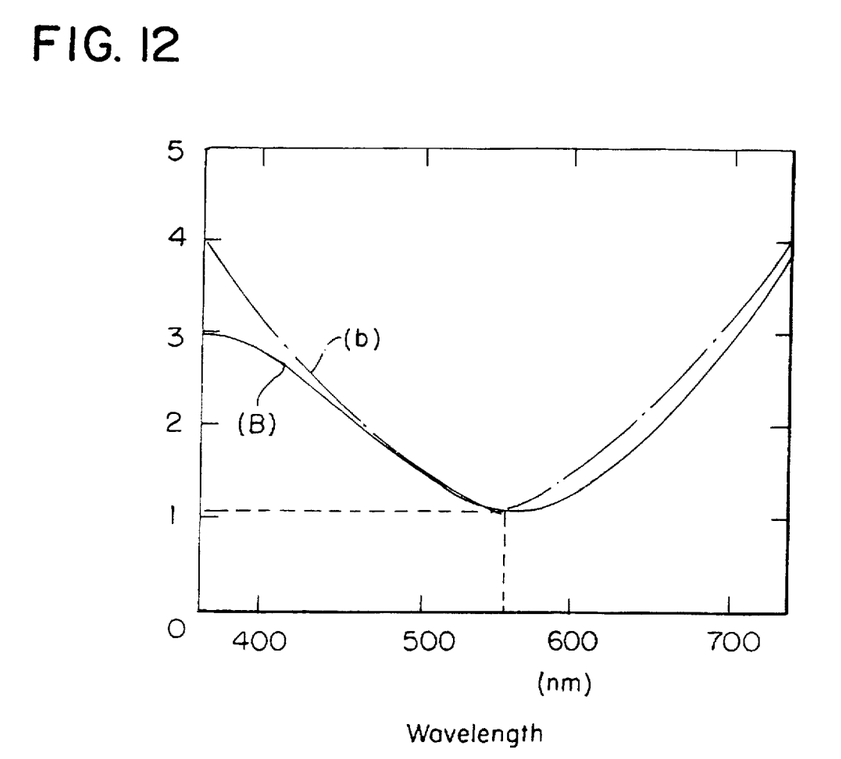
FIG. 12 is a reflection spectrum of the double-layer low-reflective coating layer according to embodiment 9.

FIG. 12 shows results of comparison between a reflection spectrum of the double-layer low-reflective coating layer 90 according to embodiment 9 in the visible ray region and the reflection spectrum of the double-layer low-reflective coating layer 9 in the visible ray region that has the conventional structure where the yellow dye 7 has not been added to the second layer but the other conditions were the same as those of the embodiment 9.

Curve (B) shows the reflection spectrum attained according to embodiment 9 and curve (b) shows the reflection spectrum of the conventional double-layer low-reflective coating layer 9.

As shown in FIG. 12, the characteristic of the reflection spectrum of the double-layer low-refractive coating layer usually has a concave shape more like a V-shape as compared with that of the triple-layer low-reflective coating layer, that is, the reflectivity in the short wavelength region and that in the long wavelength region are raised. Therefore, the reflection of colored external light is intensified.

As can be understood from FIG. 12, also in the double-layered low-reflective coating layer, the addition of the yellow dye 7 to the low-refractive smooth transparent layer 31, which was the second layer, resulted in flattening of the shape of the reflection spectrum. Thus, the reflection of colored external light was moderated and thus the reflecting a more natural colored light was obtained.

Although the yellow dye is added to the second layer in this embodiment, a similar effect is obtained in a case where the same is added to the first layer or the first and second layers.

Embodiment 10

Figure 13:
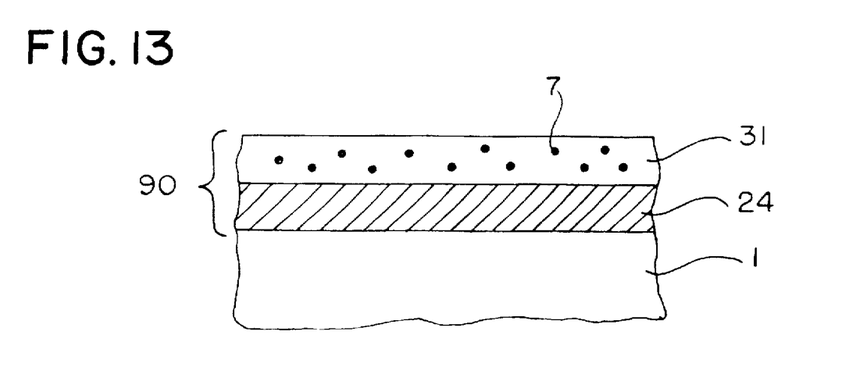
FIG. 13 is a schematic cross sectional view showing a double-layer low-reflective coating layer according to embodiment 10.

FIG. 13 is a schematic cross sectional view showing the structure of a double-layer low-reflective coating layer 90 according to embodiment 10 of the present invention.

Although the high-refractive smooth transparent conductive layer 20, which is the first layer, is formed by the spin-coating method, a high-refractive smooth transparent conductive layer 24 is, in this embodiment, formed by the CVD method, the yellow dye 7 is added to the foregoing SUMICE FINE ARG-M-1 by 0.04 wt % so as to be spin-coated so that a low-refractive transparent layer 31, which is a second layer when viewed from the face plate, is formed. Thus, the double-layer low-reflective coating layer 90 is obtained. The characteristics, such as the reflection spectrum and the film strength of the obtained double-layer low-reflective coating layer 90 were substantially the same as those obtainable from embodiment 9.

Although the yellow dye 7 is used in the foregoing embodiments 1 to 10, the use of yellow pigment in place of the yellow dye, of course, results in flattening of the reflection spectrum and suppression of the reflection of colored light.

These embodiments of the invention having the above-described structure have the following advantages.

1. In the cathode ray tube provided in the first aspect of the invention, the yellow dye or pigment is added to at least one of the layers of the triple-layer low-reflective coating layer so that an effect is obtained in that a cathode ray tube having a triple-layer low-reflective coating can be obtained in which the reflection spectrum of reflected light from the face plate can be flattened, coloring can be suppressed and a natural color of reflected light can be obtained.

2. In the cathode ray tube provided in the second aspect of the invention, the yellow dye or pigment is added to the high-refractive transparent conductive layer, which is the first layer when viewed from the face plate of the triple-layer low-reflective coating layer. Therefore, an effect can be obtained in that a cathode ray tube having a triple-layer low-reflective coat can be obtained in which the reflection spectrum of reflected light from the face plate can be flattened, coloring can be suppressed and a natural color of reflected light can be obtained, and in which the first layer, to which the yellow dye or the pigment is added, is protected by the second layer and the third layer.

3. In the cathode ray tube provided in the third aspect of the invention, the high-refractive transparent conductive layer which is the first layer when viewed from the face plate of the triple-layer low-reflective coating layer, is made of particles of $SnO_2$ or $In_2O_3$ and black-colored conductive particles. Therefore, an effect can be obtained in that a cathode ray tube can be obtained in which the yellow dye or pigment can easily be added to the first, second and the third layers.

4. In the cathode ray tube provided in the fourth aspect of the invention, the high-refractive transparent conductive layer which is the first layer when viewed from the face plate of the triple-layer low-reflective coating layer, is made of $SnO_2$ formed by the CVD method. Therefore, an effect can be obtained in that a cathode ray tube can be obtained in which the yellow dye or pigment can easily be added to the second and the third layers.

In each of the embodiments of the present invention discussed above, the high-refractive layers have refractive indices higher than that of the face plate of the CRT and the low-refractive layers have refractive indices which are lower than the refractive index of the high-refractive layer.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cathode ray tube comprising:

a triple-layer low-reflective coating layer including a high refractive transparent conductive layer formed on an outer surface of a face plate of said cathode ray tube, said high-refractive transparent conductive layer having a refractive index greater than a refractive index of the face plate, a low-refractive smooth transparent layer formed on an outer surface of said high-refractive transparent conductive layer, said low-refractive smooth transparent layer having a refractive index lower than the refractive index of said high-refractive transparent conductive layer, and a low-refractive transparent layer having concavities and convexities formed on said low-refractive smooth transparent layer, said low-refractive transparent layer having concavities and convexities having a refractive index lower than the refractive index of said high-refractive transparent conductive layer, wherein yellow dye or pigment is added to at least one of said low-refractive smooth transparent layer and said low-refractive transparent layer having concavities and convexities.

2. The cathode ray tube of claim 1, wherein said high-refractive transparent conductive layer, which is said first layer, includes particles of $SnO_2$ or $In_2O_3$ and black-colored conductive particles.

3. The cathode ray tube of claim 1, wherein said yellow dye or pigment is added to said low-refractive smooth transparent layer, which is a second layer when viewed from the outer surface of said face plate.

4. The cathode ray tube of claim 1, wherein said yellow dye or said pigment is added to said low-refractive transparent layer having concavities and convexities, which is a third layer when viewed from the outer surface of said face plate and to said high-refractive transparent conductive layer, which is a first layer when viewed from the outer surface of said face plate.

5. The cathode ray tube of claim 1, wherein said yellow dye or pigment is added to said low-refractive transparent layer having concavities and convexities, which is a third layer, when viewed from the outer surface of said face plate.

6. The cathode ray tube of claim 5, wherein said high-refractive transparent conductive layer includes $SnO_2$ particles and is formed by a Chemical Vapor Deposition (CVD) method.

7. The cathode ray tube of claim 1, wherein said yellow dye or said pigment is added to said low-refractive smooth transparent layer, which is a second layer when viewed from the outer surface of said face plate and to said high-refractive transparent conductive layer, which is a first layer when viewed from the outer surface of said face plate.

8. The cathode ray tube of claim 1, wherein said yellow dye or pigment is added to said low-refractive smooth transparent layer, which is a second layer when viewed from the outer surface of said face late, to said low-refractive transparent layer having concavities and convexities, which is a third layer when viewed from the outer surface of said face plate and to said high-refractive transparent conductive layer, which is a first layer when viewed from the outer surface of said face plate.

9. The cathode ray tube of claim 1, wherein said yellow dye or pigment is added to said low-refractive smooth transparent layer, which is a second layer when viewed from the outer surface of said face plate, and to said low-refractive transparent layer having concavities and convexities, which is a third layer when viewed from the outer surface of said face plate.

10. The cathode ray tube of claim 9, wherein said high-refractive transparent conductive layer includes $SnO_2$ particles and is formed by a Chemical Vapor Deposition (CVD) method.

11. A cathode ray tube comprising:

a double-layer low-reflective coating layer including a high-refractive transparent conductive layer, which is a first layer formed on an outer surface of a face plate of said cathode ray tube, said high-refractive transparent conductive layer having a refractive index greater than a refractive index of the face plate, and a low-refractive smooth transparent layer, which is a second layer formed on an outer surface of said high-refractive transparent conductive layer, said low-refractive smooth transparent layer having a refractive index lower than the refractive index of said high-refractive transparent conductive layer, wherein yellow dye or pigment is added to said low-refractive smooth transparent layer.

12. The cathode ray tube of claim 11, wherein said high-refractive transparent conductive layer includes $SnO_2$ particles and is formed by a Chemical Vapor Deposition (CVD) method.

13. The cathode ray tube of claim 11, wherein said yellow dye or pigment is added to said low-refractive smooth transparent layer and to said high-refractive transparent conductive layer.

14. The cathode ray tube of claim 11, wherein said high-refractive transparent conductive layer includes particles of $SnO_2$ or $In_2O_3$ and black-colored conductive particles.

15. A cathode ray tube comprising:

a triple-layer low-reflective coating layer including a high refractive transparent conductive layer formed on an outer surface of a face plate of said cathode ray tube, said high-refractive transparent conductive layer having a refractive index greater than a refractive index of the face plate, a low-refractive smooth transparent layer formed on an outer surface of said high-refractive transparent conductive layer, said low-refractive smooth transparent layer having a refractive index lower than the refractive index of said high-refractive transparent conductive layer, and a low-refractive transparent layer having concavities and convexities formed on said low-refractive smooth transparent layer, said low-refractive transparent layer having concavities and convexities having a refractive index lower than the refractive index of said high-refractive transparent conductive layer, wherein yellow dye or pigment but not violet or blue dye or pigment is added to said high-refractive transparent layer.

16. The cathode ray tube of claim 19, wherein said high-refractive transparent conductive layer includes particles of $SnO_2$ or $In_2O_3$ and black-colored conductive particles.

17. A cathode ray tube comprising:

a double-layer low-reflective coating layer including a high-refractive transparent conductive layer, which is a first layer formed on an outer surface of a face plate of said cathode ray tube, said high-refractive transparent conductive layer having a refractive index greater than a refractive index of the face plate, and a low-refractive smooth transparent layer, which is a second layer formed on an outer surface of said high-refractive transparent conductive layer, said low-refractive smooth transparent layer having a refractive index lower than the refractive index of said high-refractive transparent conductive layer, wherein yellow dye or pigment but not violet or blue dye or pigment is added to said high-refractive transparent layer.

18. The cathode ray tube of claim 17, wherein said high-refractive transparent conductive layer includes particles of $SnO_2$ or $In_2O_3$ and black-colored conductive particles.

* * * * *

UNITED STATES PATENT AND TRADEMARK OFFICE
CERTIFICATE OF CORRECTION

PATENT NO : 5,789,854
DATED : August 4, 1998
INVENTOR(S) : Tomoki TAKIZAWA et al.

It is certified that error appears in the above-identified patent and that said Letters Patent are hereby corrected as shown below:

Column 8, line 47, change "ARS-M-1" to --ARS-M-3--.

Column 9, line 5, change "ARS-M-1" to --ARG-M-1--; and line 27, change "ARS-M-1" to --ARG-M-1--.

Column 14, line 9 (claim 16), change "claim 19" to --claim 15--.

Signed and Sealed this

Eighth Day of May, 2001

Attest:

NICHOLAS P. GODICI

*Attesting Officer*     *Acting Director of the United States Patent and Trademark Office*